United States Patent [19]

Artozon Sylvester

[11] Patent Number: 5,618,330
[45] Date of Patent: Apr. 8, 1997

[54] PLANT TREATMENT COMPOSITIONS AND PROCESS

[76] Inventor: Rosa I. Artozon Sylvester, 7 Oriente, Talca, Chile

[21] Appl. No.: 575,906

[22] Filed: Dec. 20, 1995

[51] Int. Cl.⁶ ..................................................... C05D 9/02
[52] U.S. Cl. ..................................................... 71/32
[58] Field of Search ........................... 71/31, 32, DIG. 2

[56] References Cited

U.S. PATENT DOCUMENTS

| | | |
|---|---|---|
| 3,879,188 | 4/1975 | Fritz et al. . |
| 4,589,906 | 5/1986 | Brunn et al. . |
| 4,597,883 | 7/1986 | Lengyel . |
| 4,749,402 | 6/1988 | Garrett et al. ............................... 71/28 |
| 5,372,627 | 12/1994 | Konzak et al. ............................... 71/33 |

FOREIGN PATENT DOCUMENTS 3417133   11/1985   Germany .

OTHER PUBLICATIONS

CRC Trace Elements in Soils and Plants, pp. 77, 102, 133, 135, 201, 226, 238, 243. 1984.

*Primary Examiner*—Deborah Jones
*Assistant Examiner*—Amy M. Harding
*Attorney, Agent, or Firm*—Donald W. Huntley

[57] ABSTRACT

A composition having major concentrations of nitrogen, phosphorus, and potassium; trace quantities of aluminum and other metals; and chelating agent provides excellent protection against frost and stimulates growth of plants.

13 Claims, No Drawings

PLANT TREATMENT COMPOSITIONS AND PROCESS

BACKGROUND OF THE INVENTION

The present invention relates to a composition and method for the treatment of plants, and specifically to protecting plant life from injury which normally results when the temperature of ambient air falls below freezing, as well as stimulation of growth.

Multimillion dollar losses periodically occur in the agricultural industries when the temperature of the ambient air unexpectedly falls below freezing and damages or destroys the foliage, blooms and fruit on crops. This is a particular problem with citrus trees such as orange, lemon, lime and grapefruit. However, in any area which experiences frost during part of the growing season, it would be advantageous to extend the growing season by the treatment of a wide variety of crops to make them resistant to frost damage. While many techniques have previously been proposed for frost protection, a continuing need exists for compositions which simultaneously provide frost protection and promote growth in a manner that is more effective and consistent than has heretofore been possible.

SUMMARY OF THE INVENTION

The present invention provides a composition useful for plant treatment comprising (a) a major quantity of macronutrient comprising nitrogen, phosphorus and potassium wherein each of the nitrogen, phosphorus and potassium is present in a quantity of at least about 10% by weight of the macronutrients;

(b) at least about 0.1 ppm of aluminum; and (c) an effective amount of at least one chelating agent. In a preferred embodiment of the invention, the composition further comprises at least about 0.1 ppm of at least one micronutrients selected from the group consisting of boron, cobalt, copper, iron, magnesium, manganese, molybdenum, sulfur and zinc.

The present invention further provides a process for plant treatment comprising applying the above composition, preferably as an aqueous solution, to a plant in a manner that permits absorption of the composition by the plant.

DETAILED DESCRIPTION OF THE INVENTION

The present invention is based on the discovery that an aqueous solution of macronutrients, micronutrients including aluminum, and an appropriate chelating agent provide excellent frost protection for a wide variety of plants.

The macronutrients used in the present compositions, that is, the nitrogen, phosphorus and potassium, are each present in a quantity equal to at least about 10% by weight of the total weight of the macronutrients. The nitrogen can be conveniently added in the form of urea, ammonia or nitrates. The phosphorus can be conveniently added as free phosphoric acid, or as a substituted salt of an inorganic or organic phosphorus-containing acid. The potassium is conveniently added as potassium hydroxide or a potassium containing salt.

In an aqueous solution of the present compositions, the nitrogen is preferably present in a quantity of about 20–100 g/l, the phosphorus is present in a quantity of about 30–125 g/l, calculated as $P_2O_5$, and the potassium is present in a quantity of about 50–150 g/l, calculated as $K_2O$. Especially preferred are about 50–85 g/l nitrogen, about 70–110 g/l phosphorus, and 90–140 g/l of potassium. Quantities of about 70 g/l of nitrogen, 100 g/l phosphorus, and about 120 g/l of potassium have been found to be particularly satisfactory.

The micronutrients are preferably present in quantities of at least about 0.1 ppm of each of boron, cobalt, copper, iron, magnesium, manganese, molybdenum, sulfur and zinc. They can be conveniently supplied to the compositions as anions such as borate, molybdate, or sulfate, or as salts of inorganic or organic acids such as copper sulfate or copper acetate, or as inorganic or organic complexes such as iron chelate. The micronutrients are preferably present in about the following quantities, in parts per million of the aqueous solution:

| aluminum | 0.1–200 |
| copper | 1–500 |
| molybdenum | 0.1–50 |
| cobalt | 1–50 |
| magnesium | 100–5000 |
| manganese | 1–1000 |
| zinc | 5–500 |
| boron | 10–1000 |
| sulfur | 500–10,000 |
| iron | 50–1000 |

Particularly preferred are compositions in which the micronutrients are present in about the following quantities, in parts per million of the aqueous solution:

| aluminum | 0.5–5 |
| copper | 100 to 500 |
| molybdenum | 10–50 |
| cobalt | 5–20 |
| magnesium | 300–3000 |
| manganese | 1–1000 |
| zinc | 10–200 |
| boron | 100–500 |
| sulfur | 1000–5000 |
| iron | 50–200 |

The present compositions further comprise an effective amount of at least one chelating agent. The chelating agent aids in the solution of the metal components of the present formulations and aids in the absorption of the micronutrients in the present solutions by the plants. The specific chelating agent or agents used will be a matter of choice to the skilled practitioner. However, ethylene diamine tretra acetic acid (EDTA) has been found to be particularly satisfactory. Other chelating agents having structures similar to EDTA are known, and can also be used in the present invention, as will be evident to the skilled practitioner.

In the preparation of the solutions of the present invention, the order of addition of the components is not critical. However, in general, the macronutrients are first dissolved in the water followed by the micronutrients.

The solutions of the present invention can be used to treat a wide variety of plants, including, for example, non-deciduous and deciduous plants as well as cereals including wheat, barley and oats.

The compositions of the present invention provide a chlorine-free frost protectant which increases the concentration of intracellular sugars and proteins, thus depressing the freezing point of cellular fluids. While the mechanism of the frost protection is not fully understood, it is believed to be a function of an increase in the level of phytohormones. At the same time, the solutions of the present invention function as an effective biostimulant which increases crop yields.

It has surprisingly been found that minute amounts of chelated aluminum play a key role in frost protection, and in many cases further improve crop yields and plant size.

The product is rapidly absorbed, either through plant roots (ground application) or through the foliage. As this is a mixture of polar compounds, absorption through leaves is promoted by addition of a dosage of 0.1% (100 ml/100 lt of water) of a non-ionic surfactant. Surface-active agents should generally not, however, be used when applying this product through the roots.

The components of the present solutions dissolve readily in water without leaving any residue. This permits unrestricted use in mechanical irrigation systems, such as dripping and sprays, and in sprinkling systems such as watering cans, sprinklers or misters. Solutions of the present compositions are compatible with most common pesticides with the exception of those that are strongly alkaline or polar.

The specific method of application will vary with the type of plant being treated, as detailed below.

1. Non-deciduous plants:

Frost protectant applications of the product are best made during the critical period and/or according to warnings of imminent frost conditions. Surfactant should be used at a final concentration of about 0.1% in an aqueous solution. Product concentration proven to work satisfactorily in all tests (in the field as well as in growth chamber experiments) is 1% (1 lt of concentrate per 100 lt of water), and use frequency will depend on the lowest temperature expected during critical periods.

2. Deciduous plants:

Yearly plant development in deciduous plants starts first in the root system, 15–20 days before that of the foliage. It is also known that the greatest risk of frost damage occurs during the initial phase of leaf development. For example, in the case of wine or table grapes, this is from the beginning of budding until about 45 days later.

In these cases, the product of the present invention should be first directed to the root zone for absorption in order to protect the first sprouts, starting treatment 10 days before budding and repeating at about 10 day intervals until enough foliage has developed. At this point the treatment will be applied to the leaves at about 10 day intervals while frost danger is present.

The product can be used effectively by applying it at 1% aqueous concentration to the leaves until dripping. The plant leaf and growth areas should be fully wetted for optimal effect. For application from aircraft, markedly different concentrations of the application solutions will typically be used, as will be evident to those skilled in such application techniques.

The product dosage per acre for each species and type of cultivation will depend exclusively on the type of foliage area that needs to be covered. A surfactant should generally be used (100 ml per 100 lt water) for foliar applications to facilitate thorough wetting of the leaves.

3. Cereals (wheat, barley, oats, rye):

It is recommended that most care be given during the flowering period, a time when the plant is most susceptible to damage leading to severe economical losses. 1 lt of product per 100 lt of water plus 100 ml of surfactant 10 days before flowering should be used, and repeated every 15 days until the frost danger is over.

According to the type of plant and to the weather and relative humidity, the timing of treatment according to the present invention is adjusted based on when frost is expected, the season of the year and the stage of development for each plant species (budding, flowering, fruit setting, etc.).

When the present compositions are used as a biostimulant, they have increased the yields of sugar beet over 50% against controls, as measured by root weight and sugar content. In some cases it leads to earlier crop harvests.

The present solutions have not been found to cause any physiological damage to plants, while protecting them against low temperatures and increasing crop yield and plant growth. No residue is left on the crop.

The compositions can be applied to the plant in a variety of ways. As a dry formulation, the composition can be added to the soil around the plant, to be carried to the root system by subsequent watering. In fact, the components of the present compositions can be supplied to the plant separately. Preferably, however, the compositions are supplied as aqueous solutions. The methods of preferred application are summarized below.

SUMMARY OF USE INSTRUCTIONS

| PLANTINGS | DOSAGE | MODE OF APPLICATION |
|---|---|---|
| Deciduous fruit trees (Pomes, kiwis, drupes, berries) | (1 lt per 100 lt of water) | Apply enough volume of liquid to wet the root absorption area. Timing: 10 days before budding. Repeat 10 days later. Thereafter spray leaves til dripping. Continue application to foliage every 10 days until frost danger subsides. |
| (Grapevines) | (1.5 lt of 1% soln. per plant) | Apply to roots 10 days before budding; repeat 10 days after first application. Spray leaves til dripping four more times every 10 days to protect against −4° C. (or every 7 days to protect to −6° C.). If frost danger is still present, continue spraying every 15 days. |
| Non-deciduous fruit trees (citrus and avocado trees) | (1 lt per 100 lt) | Apply to foliage every 15 days during frost risk period, wetting leaves til dripping. |
| Wood trees (nurseries, grown trees) | (1 lt per 100 lt) | Apply to foliage every 15 days during frost risk period, wetting leaves til dripping. |
| Vegetables | (1 lt per 100 lt) | Outdoors or under plastic to protect against frost. Spray seedlings once with a 0.2% solution. When transplanting wet well with 0.5% solution. Then |

-continued

| PLANTINGS | DOSAGE | MODE OF APPLICATION |
|---|---|---|
| | | use 1% solution every 15 days during frost risk period. |
| Tomatos | (1 lt per 100 lt) | Apply 1% solution to seedlings twice, 7 days apart. After transplanting spray 100–200 ml (depends on ground porosity) per plant around neck and roots. Repeat treatment 5 times every 7 days. Repeat later every 30 days til end of frost. |
| Cereals (wheat, rye, oats, corn, etc.) | (1 lt per 100 lt) | Use the 1% solution 10 days before flowering, and repeat every 15 days (no less than 2 times) after flowering according to danger of frost conditions. |
| Potato | (1 lt per 100 lt) | Immerse potatoes in solution for at least 2 minutes and then plant. After sprouting, apply to foliage til dripping every 10 days until frost danger subsides. |

EXAMPLES

In the following Examples and Comparative Examples, and unless otherwise noted, solutions of the present invention were tested for frost protection and their biostimulant effect on a variety of plants. In these Examples and Comparative Examples, parts and percentages are by weight unless otherwise indicated.

In each Example of the present invention, a concentrated solution was first prepared from the following components:

| Macronutrients: | Nitrogen | 70 | g/l |
| | Phosphorus (as $P_2O_5$) | 100 | |
| | Potassium (as $K_2O$) | 120 | |
| Micronutrients: | Aluminum | 0.7 | mg/l |
| | Boron | 500 | |
| | Cobalt | 9 | |
| | Copper | 225 | |
| | Iron | 100 | |
| | Magnesium | 500 | |
| | Manganese | 500 | |
| | Molybdenum | 30 | |
| | Sulfur | 1140 | |
| | Zinc | 150 | |

Chelating agent; EDTA
Surfactant was added for foliar application at a concentration of 0.1% of the diluted solutions.
The concentrated composition, in application, was diluted 100 times unless otherwise noted.

EXAMPLE 1 AND COMPARATIVE EXAMPLES C-1 to C-6

The above formulation was tested for frost protection in Example 1. In the Comparative Examples, the following variations of this formulation were used:

| COMPOSITION | |
|---|---|
| C-1 | Composition of Example 1 without aluminum |
| C-2 | Composition of Example 1 without the macronutrients |
| C-3 | Composition of Example 1 without aluminum and without the macronutrients |
| C-4 | Only macronutrients, in same concentration as in the composition of the invention |
| C-5 | Composition of Comparative Example C-4 above plus EDTA |
| C-6 | Aluminum alone, at same concentration as in the basic formulation above, plus EDTA |

After diluting 100 times in water, each of the above compositions was sprayed til dripping on the leaves of three 12–18 months old *Eucalyptus globulus* at similar stage of development. All the test plants were transferred to a controlled temperature chamber 8 days later. The chamber temperature was lowered to 0° C. for a period of 20 minutes, and then to –6° C. for another 20 minutes.

All the test plants were removed from the temperature chamber, watered normally, and examined after 7 days. The plants treated according to Example 1 did not exhibit any damage, while plants treated in Comparative Examples using Compositions C-1, C-4 and C-5 showed burnt spices and plants treated using Compositions C-2, C-3 and C-6 looked completely burnt. Only the plants of Example 1 grew normally. Some plants from groups C-2 and C-6 eventually exhibited limited recovery, consisting in regrowth of some lateral buds. Thus, minute amounts of aluminum in a complete nutrient mixture show a surprising protective effect.

EXAMPLES 2–6

In Examples 2–6, the procedure of Example 1 was repeated, except that the concentration of aluminum was 1, 5, 25, 100 and 200 mg/l in the concentrates for Example 2–6, respectively.

After diluting 100 times with water, each of the above solutions was sprayed til dripping on the leaves of six-month old *Eucalyptus globulus* at similar stage of development. All the test plants were transferred to a controlled temperature chamber 8 days later. The chamber temperature was lowered to 0° C. for a period of 20 minutes, and then to –6° C. for another 20 minutes. After verifying that none of the plants exhibited any damage, temperature was lowered to –9° C. for a period of 30 minutes. Seven days later it was certain that all the test plants had been burnt. This suggests that higher levels of aluminum do not appear to increase frost protection in young plants. These young plants are more sensitive to frost than older trees of the same species, as 1 year old trees pretreated with the material of the invention for 1 month have shown no damage when exposed to –9° C.

EXAMPLES 7 to 14 AND COMPARATIVE EXAMPLES C-7 to C-8

The general procedure of Example 1 was repeated to determine the effects of mode of application, concentration and the use of surfactant. In Examples 8 and 10, nonionic surfactant was added in the indicated quantity.

Young *Eucalyptus globulus* plants, about 1-year old and of similar height, foliage surface and stage of development, were obtained from a nursery in mid spring. These plants were in individual bags. Application to the roots consisted of 100 ml of test solution, while foliar application was carried out spraying leaves til drip.

The treatments detailed in the Table below were repeated 3 times, each of them one week apart.

| EXAMPLE | TREATMENT | SOLUTION CONCENTRATION, % | |
|---|---|---|---|
| | | To roots | To leaves |
| C-7 | NONE | — | — |
| C-8 | FROSTGARD* | — | 10 |
| 7 | | — | 0.3 |
| 8 | (with 0.2% surfactant) | — | 0.3 |
| 9 | | — | 0.6 |
| 10 | (with 0.2% surfactant) | — | 0.6 |
| 11 | | — | 0.9 |
| 12 | | 0.9 | 0.3 |
| 13 | | 0.9 | 0.6 |
| 14 | | 0.9 | 0.9 |

*Commercially available as a genetically engineered Pseudomonas

After the last application, the plants were kept at ambient temperature of 18° to 20° C. for a week before exposing them to low temperature in a controlled temperature chamber over a 3 day period as shown below. During the first day plants were exposed to 0° C. for a period of 5 hours. During the second day the plants were exposed to −2° C. for a period of 8 hours, and during the third day plants were exposed to −4° C. for a period of 2 hours.

After the low temperature exposure test, the plants were left at ambient temperature. The following evaluation was made 30 days later:

| EXAMPLES | TREATMENT | OBSERVATIONS |
|---|---|---|
| C-7 | NONE | Defoliation and dry, adhering leaves |
| C-8 | FROSTGARD | Severe damage, partially dry leaves |
| 7 | | Severe damage |
| 8 | | Slight damage at leaf edges and apices |
| 9 | | Severe damage |
| 10 | | Slight damage at leaf edges and apices |
| 11 | | Severe damage |
| 12 | | Burnt apical and end leaves |
| 13 | | No damage |
| 14 | | No damage |

As a result of the treatment, plant height and foliage surface area were significantly larger in plants treated in Examples 8, 10, 12, 13, and 14.

EXAMPLES 15 to 17 AND COMPARATIVE EXAMPLE C-9

The general procedure of Example 1 was repeated to determine the required concentration of applied solution to provide frost protection.

In these Examples and Comparative Examples, one year old *Eucalyptus globulus* plants were watered weekly. Three similar plants were used for each of the following 4 different treatments once per week for a total period of one month, after normal watering. Leaves were sprayed til dripping with the composition of this invention at different concentration levels; each of the applied solutions contained 0.1% surfactant.

| EXAMPLE | |
|---|---|
| C-9 | Control -- no treatment besides normal watering |
| 15 | 0.25 ml solution in 100 ml water |
| 16 | 0.50 ml solution in 100 ml water |
| 17 | 1.00 ml solution in 100 ml water |

Ten days after the last application one plant of each group was transferred to a chamber with temperature control where the temperature was lowered to about −9° C. for 2 hours. Subsequent examination showed that the plant in Example 17 recovered fully although the leaves dried out after the low temperature exposure. The plant in Comparative Example 9 did not recover.

Before exposure to low temperature, leaves from the control plant and from the plant of Example 15 were dried and analyzed for proteins and sugars. The results below indicate that even in this low dosage case the test leaves contain substantially higher levels of soluble substances able to depress the freezing point of water:

| EXAMPLE | LEAF SUGAR CONTENT Dubois method | LEAF PROTEIN CONTENT Kjeldahl/McKienze |
|---|---|---|
| C-16 | 0.37% | 4.6% |
| 15 | 0.92% | 7.9% |

EXAMPLE 18 AND COMPARATIVE EXAMPLE C-10

The general procedure of Example 1 was repeated to determine soluble protein changes with time. The composition used in Example 1 was diluted 100 times with water, and sprayed til dripping on 15 one year-old plants development. Another set of 15 plants were left untreated and used as controls. All plants were watered equally.

Starting 3 days after the treatment, leaves from 3 plants chosen at random were removed, allowed to dry and analyzed for the nitrogen content from soluble proteins, using a Kjeldahl/McKienze method.

| Example | Time After Initial Treatment | Average Leaf Protein (dry leaf basis) |
|---|---|---|
| C-10 | Controls (3 days) | 2.80% |
| 18 | 3 days | 3.53% |
| | 6 days | 4.73 |
| | 9 days | 4.91 |
| | 15 days | 4.97 |
| | 19 days | 3.61 |

These results show that the treatment leads to a visible increase in the amount of soluble proteins starting as early as 3 days after treatment. Soluble protein content continues to increase steadily and peaks around 2 weeks after a single treatment. An increase in soluble proteins corresponds to reduced leaf freezing points.

EXAMPLE 19 AND COMPARATIVE EXAMPLE C-11

The general procedure of Example 1 was repeated to determine the effect of application frequency on frost protection, as measured by reduction of the freezing point.

These assays were carried out in early spring in a 7 year-old plantation of a Sauvignon Blanc grapevine variety. Freezing point was measured by cooling recently cut grapevine buds in a freezer. A thermocouple was inserted at the bottom of a recently cut bud, and placed in a freezer controlled at −9 C. The temperature of the thermocouple was recorded; it decreased steadily until the freezing point was reached, which was evidenced by a sudden temperature increase caused by the heat released upon water crystallization.

Composition A was diluted 100 times in water, and applied as a spray until green tips or leaves were fully wetted, at an approximate rate of 450 liters per hectare. Over a period of 8 weeks, 3 different frequencies of addition were tested on different plants: every 7, 14 and 21 days respectively. The freezing points measured near the end of the test period are shown in the Table:

TABLE

| Example | Frequency of addition | Freezing point in °C. |
| --- | --- | --- |
| C-11 | Untreated | −0.5 |
| 19 | Every 21 days | −0.5 to −2 |
|  | Every 14 days | −2 to −3.5 |
|  | Every 7 days | −5 to −6.5 |

EXAMPLES 20 to 23 AND COMPARATIVE EXAMPLE C-12

The general procedure of Example 1 was repeated to determine the frost protecting effect of different frequencies of application resulting in equal cummulative doses of solution.

Chardonnay and Cabernet healthy grapevine stock in pots, with average 0.6 meter height, were treated as shown in the Table with the solution applied to the soil. The tests were done in triplicate starting in mid-March (late summer in the southern hemisphere).

| Example | Dosage | Application |
| --- | --- | --- |
| C-12 | None | None |
| 20 | 100 ml of 1.0% solution | Days 1, 4, 7, 11, 14, 19 |
| 21 | 100 ml of 1.2% solution | Days 1, 4, 7, 11, 14, 19 |
| 22 | 200 ml of 1.0% solution | Days 1, 7, 14 |
| 23 | 200 ml of 1.2% solution | Days 1, 7, 14 |

On day 19 ambient temperature dropped to 0.3 C. Seven days after the end of the treatment the plants were subjected to a temperature of 0 C for a period of 12 hours and then kept at ambient temperature until the next day. The temperature was then lowered to −2° C. for a period of 2 hours before returning to ambient temperature. All plants were examined 3 days later.

All the control plants showed completely dry (burnt) leaves, with the petioles adhering to the stems.

The plants of Examples 20 and 22 (1.0% solution) showed healthy spices; however, the lower leaves appeared dry without loss of color.

The plants of Examples 21 and 23 (1.2% solution) were completely green with slight withering of the lower leaves.

All plants (including controls) were then exposed to −3° C. for a period of 2 hours, which led to drying of leaves without loss of color for the plants of Examples 12–15. All plants were then left outdoors and exposed to fall and winter weather. The leaves fell as normal in late autumn. Surprisingly, the Chardonnay stock started to bud in mid-winter (late July in Chile), with leaves appearing around August 20. The Cabernet stock started budding in late August. None of the controls recovered even by late November.

EXAMPLES 24 to 31 AND COMPARATIVE EXAMPLE C-13

The general procedure of Example 1 was repeated to show the effect of different concentrations of solution applied either to soil alone, or to both soil and foliage.

Tomato seedlings (fertilized with P, N and K) of equal size and stage of development were transplanted in late spring to individual pots and treated with a total amount of 200 ml of test solution 3 times at 1 week intervals. Five randomly chosen plants were used for each of the treatment regimens shown below. Control plants received only 200 ml water.

| TREATMENTS | SOLUTION CONCENTRATION, % | |
| --- | --- | --- |
| Example | Soil | Foliage* |
| C-13 | 0.0 | 0.0 |
| 24 | 0.6 | none |
| 25 | 0.8 | none |
| 26 | 1.0 | none |
| 27 | 1.2 | none |
| 28 | 0.6 | 0.6 |
| 29 | 0.6 | 0.8 |
| 30 | 0.6 | 1.0 |
| 31 | 0.6 | 1.2 |

*Foliar applications used 0.2% surfactant.

One week after the last series of applications all plants were transferred to a chamber with temperature control, where temperature was set at 10° C. for the first 3 days. On day 4 all plants were exposed to 0° C. por a period of 4 hours. On day 5 all plants were exposed to −2° C. for a 4 hour period, and on day 6 they were also exposed to −4° C. for a 4 hour period. The temperature was 10° C. during intermediate times.

All plants were then left at ambient temperature and watered every 3 days. They were examined 16 days after the last exposure to cold, and the following observations were made:

Strong withering was observed in Control Example C-13 immediately after exposure to 0° C., and very noticeable damage after exposure to −2° C. At the end of the observation period the plants were totally dry and showed no recovery with time. The plants of Examples 24 to 31 showed the following:

| | |
| --- | --- |
| 24 | Severe damage to basal leaves. Fruit was apparently not damaged. Flowers were aborted. |
| 25 | Severe damage to basal leaves. Fruit was apparently not altered. Basal flowers seemed damaged. |
| 26 | Slight damage to basal leaves. Healthy fruit. Flowers were pollinized and set. |
| 27 | Only one plant had damaged basal leaves; the rest suffered no leaf damage. New fruit is seen. |
| 28 | Severe damage to basal leaves. Only very small green fruits. Flowers were aborted. |
| 29 | Severe damage to foliage. Small and medium fruits are developing. |
| 30, 31 | Slight damage to basal leaves. Small and medium fruits are developing. |

All fruits were of green color.

The test was terminated one month later, and the fruit was harvested and examined. The following average yields of fruits of various sizes were collected per plant:

| EXAMPLE | NORMAL | MEDIUM | SMALL | ABORTED |
| --- | --- | --- | --- | --- |
| C-13 | 0 | 0 | 0 | 6 |
| 24 | 0 | 3 | 2 | 1 |
| 25 | 0 | 1 | 2 | 3 |
| 26 | 4 | 3 | 1 | 0 |
| 27 | 6 | 1 | 2 | 1 |
| 28 | 0 | 0 | 0 | 3 |
| 29 | 0 | 2 | 2 | 2 |
| 30 | 0 | 5 | 2 | 4 |
| 31 | 0 | 4 | 2 | 3 |

These results show that 1.0 and 1.2% soil applications are extremely effective to protect new tomato plants against frost damage.

Low temperature damage to tomato plants starts already at temperatures below 10° C., and leads to color deficiency upon ripening, as well as to increased Alternaria incidence.

EXAMPLES 32 to 34 AND COMPARATIVE EXAMPLE C-14

The purpose of this test was to determine the frost protection effect of several concentrations of the composition of this invention.

The test was perforated with maize H1 seeds, during late spring. The maize seeds were placed in individual pots, and each test concentration as well as the untreated controls were repeated 5 times.

The following concentrations of the composition were tested:

| EXAMPLE | DOSE |
| --- | --- |
| C-14 | 0.0% |
| 32 | 0.5% |
| 33 | 1.0% |
| 34 | 2.0% |

The test was started with inhibition of maize seeds in each of the test solutions. The following day the seeds were placed in individual pots. One and 2 weeks later, 200 ml of the corresponding test solution were added to each pot. The plants were then kept at ambient temperature for another week, at the end of which all plants were exposed to short periods of low temperature (and otherwise kept at ambient temperature) as follows:

| DATE | TEMPERATURE, °C. | EXPOSURE TIME, hr |
| --- | --- | --- |
| Day 1 | 5 | 10 |
| Day 6 | 3 | 3 |
| Day 12 | 0 | 3 |
| Day 14 | −1 | 2 |
| Day 20 | 3 | 3 |
| Day 20 | 0 | 1 |
| Day 20 | −3 | 1 |
| Day 20 | −4 | 1 |
| Day 20 | −5 | 1 |

Starting one day after the last exposure to low temperature, the following observations were made about plant condition over time:

| DATE | EXAMPLE | HEALTHY PLANTS | DAMAGED* PLANTS | DEAD PLANTS |
| --- | --- | --- | --- | --- |
| Day 1 | C-14 | 2 | 3 | 0 |
|  | 32 | 3 | 2 | 0 |
|  | 33 | 4 | 1 | 0 |
|  | 34 | 2 | 3 | 0 |
| Day 8 | C-14 | 0 | 4 | 1 |
|  | 32 | 0 | 4 | 1 |
|  | 33 | 4 | 1 | 0 |
|  | 34 | 1 | 3 | 1 |
| Day 25 | C-14 | 0 | 1 | 4 |
|  | 32 | 4 | 1 | 0 |
|  | 33 | 4 | 1 | 0 |
|  | 34 | 2 | 1 | 2 |

*Damaged plants: alterations in stems and leaves, chlorosis and necrosis

Plants treated with 0.5% and 1.0% concentrations showed a remarkable recovery after low temperature exposure. Although the treatment with 2.0% concentration does not appear effective, the seeds could have been damaged during the inhibition step. All plants were then transplanted to the ground 5 days after the last above observation.

EXAMPLES 35 to 36 AND COMPARATIVE EXAMPLE C-15

In Examples 35, 36, the formulation of Example 1 was used to determine whether sugar beet could be grown in the off-season, and if larger amounts of micronutrients were helpful or toxic. In Examples 35, 36 and Comparative Example C-15, three lots measuring 100, 50 and 50 sq meter were used for planting in early summer. At seeding time all three lots were fertilized by applying phosphorus and nitrogen at rates of 108 and 124 kgs per hectare, respectively, plus 200 g borax at a rate per 200 sq meters. Starting after the second leaf was visible (in early autunm), nitrogen was applied to all three lots at the rate of 115 kgs per hectare and with a frequency of 3 times per week.

The 100 sq. meter lot of Example 35 was additionally treated 5 times with 200 l of water containing the diluted composition of the present invention used in Example 1, starting one month after seeding and every 10 days thereafter. The corresponding concentrations were: 0.5%, 1%, 1.25%, 1.25% and 1.25%.

The 50 sq. meter lot for Example 36 underwent the same additional treatment as lot A, but the amount of micronutrients, including aluminum, was increased 4-fold in the first 3 applications. The 50 sq. meter lot for Control Example 15 had no further treatment. The harvest yielded the following results:

| Example | |
| --- | --- |
| 35 | 70 tons (18% sugar) per hectare |
| 36 | 70 tons (18% sugar) per hectare |
| C-15 | 46 tons (18% sugar) per hectare. |

Thus, the treatment with compositions of the present invention yielded a 50% yield improvement. The yield of 70 ton (18% sugar) in the off-season is considered by experts to be extremely high. Sugar beet has a large content of dissolved organics and is not subject to frost problems. No pesticides were used during these tests, indicating that the treatment imparts great resistance to the plants. The same type of treatment during the normal season (seeding around early to mid spring) produces yields of 80 to 100 ton (18% sugar) per hectare while untreated plants produced only 60 ton (18% sugar) per hectare.

This test also showed that increasing micronutrient concentration 4-fold had neither a beneficial nor a deleterious effect.

EXAMPLES 37, 38 AND COMPARATIVE EXAMPLE C-15

In Examples 37, 38, the effect of fertilization of lettuce with compositions of the present invention was evaluated.

Three lots consisting of 4 rows of 20 m length each were planted with long-leaf winter lettuce seedlings, and fertilized with rabbit manure (20 cubic meters per hectare) and urea (45 kg N per hectare). All lots were equally watered and sprayed with pesticides. The lot of Control Example C-15 was left without further treatment as a control. The lot of Example 37 was treated with foliar application of the invention composition diluted to 0.5% til dripping, starting 2 weeks after planting, and repeating treatment 4 additional times at 15-day intervals. The lot of Example 38 was treated as Example 37 but adding a 3-fold greater concentration of micronutrients, including aluminum, to the solution.

The following results were measured after harvesting:

| Example | |
|---|---|
| C-15 | 400–500 g avg. weight per head; green yellowish color |
| 37 | 600–800 g avg. weight per head; deep green color |
| 38 | 1200–1300 g avg. weight per head; deep dark green color |

The treatment of Example 37 yields substantially better results than Comparative Example C-15. The treatment of Example 38, with 3-fold increased micronutrients, produced much lager plants with thicker stems and shinier leaves.

EXAMPLES 39 to 42 AND COMPARATIVE EXAMPLES C-16 and C-17

In these Examples and Comparative Examples, the effect of the number of foliar applications on growth, with and without a basic fertilizer application, was determined for use on broccoli.

Six different conditions were tested, of which the first 3 did not have soil basic fertilization, while the remaining 3 did. The basic fertilization involved urea and phosphates at levels of 255 (calculated as N) and 30 (calculated as $P_2O_5$) kg per hectare respectively.

Each foliar application required 1 to 2 lt of the concentrated solution of this invention per hectare, diluted with water to 0.5% concentration. The applications were started 2 weeks after planting and repeated on a weekly basis.

| EXAMPLE | BASIC FERTILIZATION | NO. OF FOLIAR APPLICATIONS |
|---|---|---|
| C-16 | No | 0 |
| 39 | No | 4 |
| 40 | No | 6 |
| C-17 | Yes | 0 |
| 41 | Yes | 4 |
| 42 | Yes | 6 |

Upon harvesting, the following results were observed:

| EXAMPLE | AVG. WT. CENTRAL INFLORESCENCE | HEAD PERIMETER | YIELD PER HECTARE |
|---|---|---|---|
| C-16 | 241 g | 37 cm | 8.5 ton |
| 39 | 230 | 35 | 8.0 |
| 40 | 276 | 38 | 10.0 |
| C-17 | 318 | 43– | 11.3 |
| 41 | 331 | 41 | 12.5 |
| 42 | 340 | 43+ | 13.2 |

The best results were obtained in Example 42, which allowed a 17% increase in productivy per hectare as compared with the basic fertilization in Comparative Example 17.

I claim:

1. A composition useful for plant treatment comprising
   (a) a major quantity of macronutrient comprising nitrogen, phosphorus and potassium wherein each of the nitrogen, phosphorus, calculated as $P_2O_5$, and potassium, calculated as $K_2O$, is present in a quantity of at least about 10% by weight of the macronutrients;
   (b) at least about 0.1 ppm of at least one micronutrient selected from the group consisting of boron, cobalt, copper, iron, magnesium, manganese, molybenum, sulphur, and zinc
   (c) at least about 0.1 ppm of aluminum; and
   (d) an effective amount of at least one chelating agent.

2. A composition of claim 1 in the form of an aqueous solution.

3. A composition of claim 2 wherein the micronutrients are present in about the following quantities, in parts per million of the aqueous solution:

| | |
|---|---|
| aluminum | 0.1–200 |
| copper | 1–500 |
| molybdenum | 0.1–50 |
| cobalt | 1–50 |
| magnesium | 100–5000 |
| manganese | 1–1000 |
| zinc | 5–500 |
| boron | 10–1000 |
| sulfur | 500–10000 |
| iron | 50–1000. |

4. An aqueous plant treatment composition which protects plants from frost damage comprising
   (a) a major quantity of macronutrient comprising nitrogen, phosphorus and potassium wherein each of the nitrogen, phosphorus, calculated as $P_2O_5$, and potassium, calculated as $K_2O$, is present in a quantity of at least about 10% by weight of the macronutrients;
   (b) the following micronutrients, in about the following quantities, in parts per million of aqueous solution

| | |
|---|---|
| aluminum | 0.5–5 |
| copper | 100–500 |
| molybdenum | 10–50 |
| cobalt | 5–20 |
| magnesium | 300–3000 |
| maganese | 10–1000 |
| zinc | 10–200 |
| boron | 100–500 |
| sulfur | 1000–5000 |
| iron | 50–200 |

(c) at least about 0.1 ppm of aluminum; and (d) an effective amount of at least one chelating agent.

5. A composition of claim 2 wherein nitrogen is present in a quantity of about 20–100 g/l, phosphorus is present in a quantity of about 30–125 g/l, calculated as $P_2O_5$, and potassium is present in a quantity of about 50–150 g/l calculated as $K_2O$.

6. A composition of claim 5 wherein nitrogen is present in a quantity of about 50–85 g/l, phosphorus is present in a quantity of about 70–110 g/l, and potassium is present in a quantity of about 90–140 g/l.

7. A composition of claim 6 wherein nitrogen is present in a quantity of about 70 g/l, phosphorus is present in a quantity of about 100 g/l, and potassium is present in a quantity of about 120 g/l.

8. A composition of claim 2 further comprising an amount of at least one surfactant effective to promote the absorption of the composition into the plant.

9. A process comprising applying an aqueous solution of the composition of claim 2 to the roots or foliage of a plant to permit absorption of the composition by the plant.

10. A process of claim 9 wherein the solution has a total dissolved solids of at least about 100 g/l.

11. A composition of claim 1 further comprising an amount of at least one surfactant effective to promote the absorption of the composition into the plant.

12. A composition of claim 1 wherein the chelating agent consists essentially of EDTA.

13. A process comprising applying an aqueous solution of the composition of claim 1 to the roots or foliage of a plant to permit absorption of the composition by the plant.

* * * * *